3,033,853
PREPARATION OF HYDROXYALKYL STARCHES
Eugene D. Klug, Wilmington, Del., assignor to Hercules Powder Company, Wilmington, Del., a corporation of Delaware
No Drawing. Filed Apr. 15, 1959, Ser. No. 806,416
3 Claims. (Cl. 260—233.3)

This invention relates to a process of preparing starch derivatives and more particularly to an improved process of preparing cold water soluble hydroxyalkyl starches.

Hydroxyalkyl starches are well known and have a number of uses, but their commercial success has been limited for a number of reasons. Heretofore it was logically thought necessary to employ a highly concentrated aqueous dispersion of starch to carry out the hydroxyalkylation reaction in order for the efficiency of the reaction to be feasible. Hydroxyalkylation efficiency is used herein to mean the percent of the hydroxylation agent input which reacts with the starch. One of the best conventional processes known for making hydroxyalkyl starches involves partially hydroxyalkylating an aqueous starch dispersion at an elevated temperature in the presence of a hydroxyalkylation catalyst such as sodium hydroxide, the water/starch weight ratio being as low as 0.5/1 and never higher than 2/1.

There are several disadvantages to employing such concentrated aqueous dispersions of starch. One obvious disadvantage is that such dispersions are difficult to handle. Another disadvantage is that dissipation of the heat of the hydroxyalkylation reaction is difficult. An additional disadvantage is that unless a pressure system is employed with a gaseous or highly volatile hydroxyalkylation agent, e.g. ethylene oxide, large amounts of ethylene oxide are lost by evaporation.

However, the prior art has tolerated the above disadvantages because they logically thought that such concentrated aqueous slurries of starch were necessary in order to obtain a hydroxyalkylation efficiency which was at all practical.

According to the present invention, I have found that surprisingly high and quite practical hydroxyalkylation efficiencies can be obtained using aqueous slurries of starch far more dilute than heretofore thought possible, and at the same time eliminating or minimizing the above-mentioned disadvantages of the prior art. My improved process broadly comprises reacting starch with a hydroxyalkylation agent in the presence of water and hydroxyalkylation catalyst, and recovering the resulting product, the water/starch ratio being 2.5/1–6.5/1 by weight. More specifically, my process comprises reacting an aqueous dispersion of starch with a hydroxyalkylation agent at a temperature of 60° C.–75° C. for 2–3 hours in the presence of a catalyst, neutralizing the hydroxyalkylation reaction mixture and drying the resulting hydroxyalkyl starch product.

Although the present invention is applicable to hydroxyalkyl starches, it will be described for the most part hereinafter with reference to the two most preferred hydroxyalkyl starches, namely hydroxyethyl starch and hydroxypropyl starch, because they are of most interest commercially.

The following examples, wherein parts and percent are by weight unless otherwise indicated, illustrate various embodiments of the present invention. Also, unless otherwise indicated, all ratios are based on bone dry starch, and the hydroxyalkylation reaction was carried out at atmospheric pressure.

EXAMPLES 1–4

*Hydroxypropylation Effect of Water/Starch Ratio*

To a stirred dispersion of wheat starch in water, sodium hydroxide was added as a 50% solution. This dispersion was stirred 1 hour at room temperature and propylene oxide was added. Because of the limited solubility of propylene oxide, 1 volume of propylene oxide was diluted with 2 volumes of water before adding to the dispersion. The reaction mixture was heated to 70° C.–75° C. in 1 hour and kept at that temperature for 2.5–3 hours. Then the alkali in the resulting hydroxypropyl starch dope was neutralized with acetic acid and drum dried at 80 p.s.i. steam pressure in the drums. Grinding reduced the hydroxypropyl starch product to a powder which was soluble in cold water. 5% cold water solutions of the hydroxypropyl starch were prepared by tumbling at room temperature. Further conditions and results are given in Table 1 below.

TABLE 1.—EXAMPLES 1-4, HYDROXYPROPYLATION EFFECT OF WATER/STARCH RATIO

| Example No. | Ratio, Water/ Starch | Ratio, NaOH/ Starch | Ratio Propylene Oxide/ Starch | M.S. | Propylene Oxide Efficiency, Percent | Cold Water Solution Properties |
|---|---|---|---|---|---|---|
| 1 | 2.4 | 0.017 | 0.20 | 0.23 | 42 | Fair. |
| 2 | 4.4 | 0.017 | 0.20 | 0.23 | 42 | Good. |
| 3 | 6.4 | 0.017 | 0.20 | 0.21 | 38 | Good. |
| 4 | 12.2 | 0.017 | 0.20 | 0.12 | 22 | Poor. |

EXAMPLES 5–11

*Hydroxyethylation and Hydroxypropylation Effect of NaOH/Starch Ratio*

The hydroxyethylation Examples 5–8 were carried out in the same manner as Examples 1–4 above except as shown in Table 2 below and except the ethylene oxide used was added as a 50% aqueous solution by volume. The hydroxypropylation Examples 9–11 were carried out in the same manner as Examples 1–4 above using the conditions shown in Table 2 below.

TABLE 2.—EXAMPLES 5-11, HYDROXYETHYLATION (5-8), HYDROXYPROPYLATION (9-11) EFFECT OF NaOH/STARCH RATIO

| Example No. | Ratio, Water/ Starch | Ratio, NaOH/ Starch | Ratio, Alkylene Oxide/ Starch | M.S. | Alkylene Oxide Efficiency Percent | Cold Water Solution Properties |
|---|---|---|---|---|---|---|
| 5 | 5.3 | 0.00085 | 0.20 | 0.14 | 19 | Poor. |
| 6 | 5.3 | 0.0085 | 0.20 | 0.34 | 46 | Fair. |
| 7 | 5.3 | 0.017 | 0.20 | 0.44 | 60 | Good. |
| 8 | 5.3 | 0.025 | 0.20 | 0.52 | 71 | Good. |
| 9 | 5.1 | 0.0085 | 0.20 | 0.19 | 34 | Fair. |
| 10 | 5.1 | 0.017 | 0.20 | 0.25 | 45 | Good. |
| 11 | 5.1 | 0.025 | 0.20 | 0.35 | 63 | Good. |

EXAMPLES 12–16

*Hydroxyethylation Effect of Ethylene Oxide/Starch Ratio*

These examples were conducted under the same conditions as Examples 5–8 above, except as shown in Table 3 below. The efficiencies of Examples 15 and 16 suffered some from the mechanical loss (evaporation) of ethylene oxide which resulted from the high ethylene oxide to starch ratios at atmospheric pressure.

TABLE 3.—EXAMPLES 12-16, HYDROXYETHYLATION EFFECT OF ETHYLENE OXIDE/STARCH RATIO

| Example No. | Ratio, Water/ Starch | Ratio, NaOH/ Starch | Ratio, Ethylene Oxide/ Starch | M.S. | Ethylene Oxide Efficiency, Percent | Cold Water Solution Properties |
|---|---|---|---|---|---|---|
| 12 | 4.1 | 0.017 | 0.10 | 0.19 | 52 | Fair. |
| 13 | 4.65 | 0.017 | 0.20 | 0.44 | 60 | Good. |
| 14 | 4.4 | 0.017 | 0.40 | 0.89 | 61 | Good. |
| 15 | 4.5 | 0.025 | 0.50 | 1.20 | 65 | Good. |
| 16 | 4.75 | 0.025 | 0.75 | 1.68 | 61 | Good. |

The hydroxyalkyl starch products of this invention were tested for solution properties by tumbling sufficient amounts of the hydroxyalkyl starch and water at room temperature to form a 5% solution. The solution was observed visually when prepared and after standing at room temperature for solution structure and granularity. Then the solution was graded for solution properties as poor, fair, and good in that order as the extent of lumpiness and granularity decreased. Solutions rated as poor had a substantial amount of lumpiness and granularity, those rated as fair were slightly lumpy and granular, and those rated as good were practically free of lumpiness and granularity. Thus, the smoothness of the solution increases as the lumpiness and granularity decrease. As will be seen from the above examples, in order to obtain a product which will give the desired smoothness of solution when dissolved in water, it will be seen that the water/starch ratio must not reach about 12/1. Although water/starch ratios above 6.5/1 are within the scope of this invention, they are not desired because above this ratio the hydroxyalkylation efficiency decreases and there is no substantial increase in solution smoothness. It will likewise be appreciated by those skilled in the art that the water/starch ratios given herein can be varied somewhat and still obtain substantially equivalent solutions, provided the various other conditions are properly chosen, and to this extent these conditions are interdependent.

Although extremely small amounts will suffice, the use of a hydroxyalkylation catalyst is necessary in the present invention. Various alkaline materials are applicable for this catalyst, as those skilled in the art know, including alkali metal hydroxides, various salts having an alkaline reaction, ammonium or organic bases. Sodium hydroxide has been found to work quite well.

The amount of hydroxyalkylation catalyst used has a bearing on the hydroxyalkylation efficiency, as will be seen from the above examples. For instance, at a water/starch ratio of about 5/1 the hydroxyalkylation efficiency improved with an increase in sodium hydroxide/starch ratio from 0.00085/1 to 0.025/1. Although greater amounts of sodium hydroxide can be used, there usually will not be adequate justification for it. Moreover, for some uses of the product, a disadvantage of employing large amounts of caustic is that the product has a higher ash content.

As would be expected, hydroxyalkylation efficiency varies directly with the alkylene oxide/starch ratio. This is shown by Table 3 above, keeping in mind that the ethylene oxide efficiency of the last two examples in that table were reduced because of evaporation of ethylene oxide at the high ethylene oxide/starch ratios and low pressure (atmospheric) used.

As the amount of hydroxyalkyl substitution (i.e. the moles of alkylene oxide per mole of starch, herein called M.S.) is increased from zero to about 0.2 or 0.3, the solubility in water of the hydroxyalkyl starch product increases. The Zeisel-Morgan method was used to determine the M.S. values of the hydroxyalkyl starches made according to the present invention. In order to make these M.S. determinations more accurate, the hydroxyalkyl starch product was first purified by extraction with anhydrous isopropanol to remove polymer and glycols.

The temperature and time of hydroxyalkylation reaction are not critical. Anyone skilled in this art knows the temperature and time to use to obtain a gelatinized hydroxyalkyl starch product of any desired degree of substitution. I found that a hydroxyalkylation temperature of 60° C.–75° C. for 2–3 hours gives very good results. Although atmospheric pressure is quite satisfactory under most conditions, a slight pressure (e.g. 10–25 p.s.i.) gives somewhat higher hydroxyalkylation efficiencies, particularly with high alkylene oxide/starch ratios and this is due in part to lessening the loss due to evaporation of the alkylene oxide. Other pressures may be used but they are not preferred. As would be expected, time varies inversely with temperature and also with pressure.

Alkylene oxides applicable in the present invention are those in which the oxygen is linked to two adjacent carbon-hydrogen groups, i.e. compounds containing the ethylene oxide structure, e.g. ethylene oxide, propylene oxide, etc.; 3,4-epoxy-1-butene, epichlorohydrin; and the like; and mixtures of these.

Several means are known for drying starch, and they are applicable to the present invention. These include drum drying, spray drying, flash drying, and pan drying or simple evaporation.

Starches derived from any sources, including e.g. wheat, corn, potato, tapioca, waxy maize, rice, sago, grain sorghum may be used in practicing this invention. The "starch" used as the starting material in my invention may be oxidized starch, hydrolyzed starch or dextrinized starch, as well as untreated starch and tailings.

As many apparent and widely different embodiments of this invention may be made without departing from the spirit and scope thereof, it is to be understood that I do not limit myself to the specific embodiments thereof except as defined in the appended claims.

What I claim and desire to protect by Letters Patent is:

1. The process of preparing hydroxyalkyl ethers of starch which comprises reacting starch with an alkylene oxide in the presence of water and an alkali catalyst, and recovering the resulting starch ether product, the weight ratio of water/starch, alkali/starch and alkylene oxide/starch being 4.4/1–6.4/1, 0.017/1–0.025/1 and 0.10/1 to 0.75/1 respectively.

2. Process of claim 1 wherein the alkylene oxide is ethylene oxide.

3. Process of claim 1 wherein the alkylene oxide is propylene oxide.

References Cited in the file of this patent
UNITED STATES PATENTS

| | | |
|---|---|---|
| 2,558,463 | Balassa | Mar. 11, 1952 |
| 2,744,894 | Benedict et al. | May 8, 1956 |
| 2,773,057 | Hjermstad et al. | Dec. 4, 1956 |
| 2,845,417 | Kesler et al. | July 29, 1958 |